United States Patent [19]

Veech

[11] Patent Number: 4,742,657

[45] Date of Patent: May 10, 1988

[54] WALL STRUCTURE AND METHOD OF MAKING

[76] Inventor: Robert D. Veech, 11 Yates Ave., Commack, N.Y. 11725

[21] Appl. No.: 828,969

[22] Filed: Feb. 12, 1986

Related U.S. Application Data

[63] Continuation-in-part of Ser. No. 665,442, Oct. 26, 1984, abandoned.

[51] Int. Cl.⁴ ............................................. E04B 1/10
[52] U.S. Cl. ........................................ 52/233; 52/286; 52/586; 403/294; 403/403
[58] Field of Search ........... 52/233, 286, 586, DIG. 6; 403/174, 178, 294, 298, 403; 446/105–108, 125, 127

[56] References Cited

U.S. PATENT DOCUMENTS

| 1,695,553 | 12/1928 | Jones et al. | 52/285 |
|---|---|---|---|
| 2,031,848 | 2/1936 | Ogden | 446/105 |
| 2,320,466 | 6/1943 | Presley | 52/90 |
| 2,403,934 | 7/1946 | Lindstrom | 52/233 |
| 2,550,883 | 5/1951 | St. Vincent | 52/233 |
| 2,619,686 | 12/1952 | Dombrowski | 52/233 |
| 3,527,005 | 9/1970 | Slavens | 52/227 |
| 3,908,322 | 9/1975 | Shoaf | 52/90 |
| 3,995,402 | 12/1976 | Parenteau | 52/241 |
| 4,035,977 | 7/1977 | Fisher | 52/586 |
| 4,219,977 | 9/1980 | Bene et al. | 52/94 |
| 4,250,677 | 2/1981 | Yablonski | 52/233 |
| 4,279,108 | 7/1981 | Collister | 52/233 |
| 4,305,238 | 12/1981 | Harward et al. | 52/233 |
| 4,356,676 | 11/1982 | Hauptman | 52/403 |
| 4,567,701 | 2/1986 | Biggs et al. | 52/233 |
| 4,649,683 | 3/1987 | Dolata | 52/233 |

FOREIGN PATENT DOCUMENTS

| 571438 | 3/1959 | Canada | 52/233 |
|---|---|---|---|
| 631778 | 2/1935 | Fed. Rep. of Germany | 446/105 |
| 2812503 | 9/1979 | Fed. Rep. of Germany | 403/294 |
| 902839 | 9/1945 | France | 446/105 |
| 1517692 | 3/1968 | France | 52/233 |
| 2389725 | 1/1979 | France | 52/233 |
| 2524034 | 9/1983 | France | . |
| 412813 | 2/1946 | Italy | 446/127 |
| 7512942 | 1/1977 | Netherlands | 446/105 |
| 8404939 | 12/1984 | World Int. Prop. O | 52/233 |
| 324647 | 6/1970 | Sweden | . |
| 1534501 | 12/1978 | United Kingdom | 52/586 |

Primary Examiner—John E. Murtagh
Assistant Examiner—Andrew J. Rudy
Attorney, Agent, or Firm—Senniger, Powers, Leavitt and Roedel

[57] ABSTRACT

A wall structure having vertical end members and a vertical intermediate member. A set of horizontal members are located between the vertical members and are interconnected by horizontal splines. A vertical spline engages the ends of the horizontal members and the vertical members. A top spline engages the top horizontal member and the top ends of the vertical members. A top cap spanning across the vertical intermediate member engages the top spline. A spline tab engages slots in adjacent horizontal members and the vertical slot of the vertical member adjacent to the horizontal members.

9 Claims, 7 Drawing Sheets

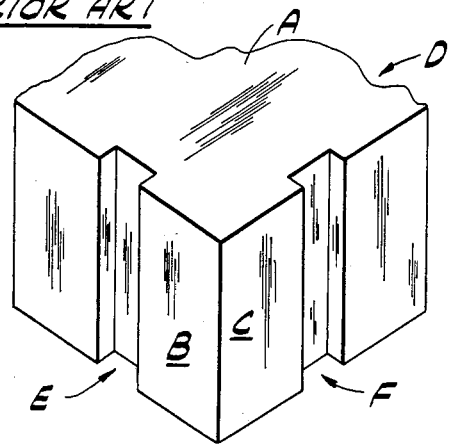
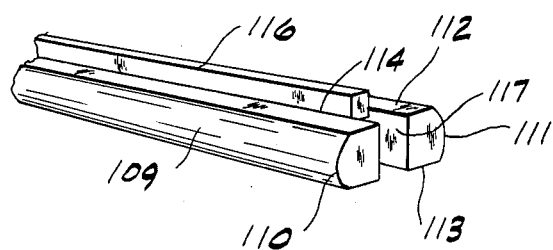
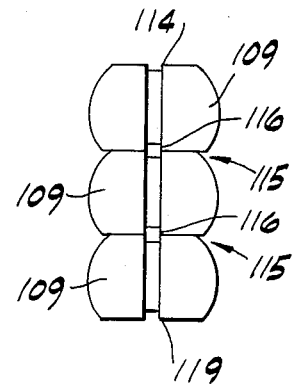
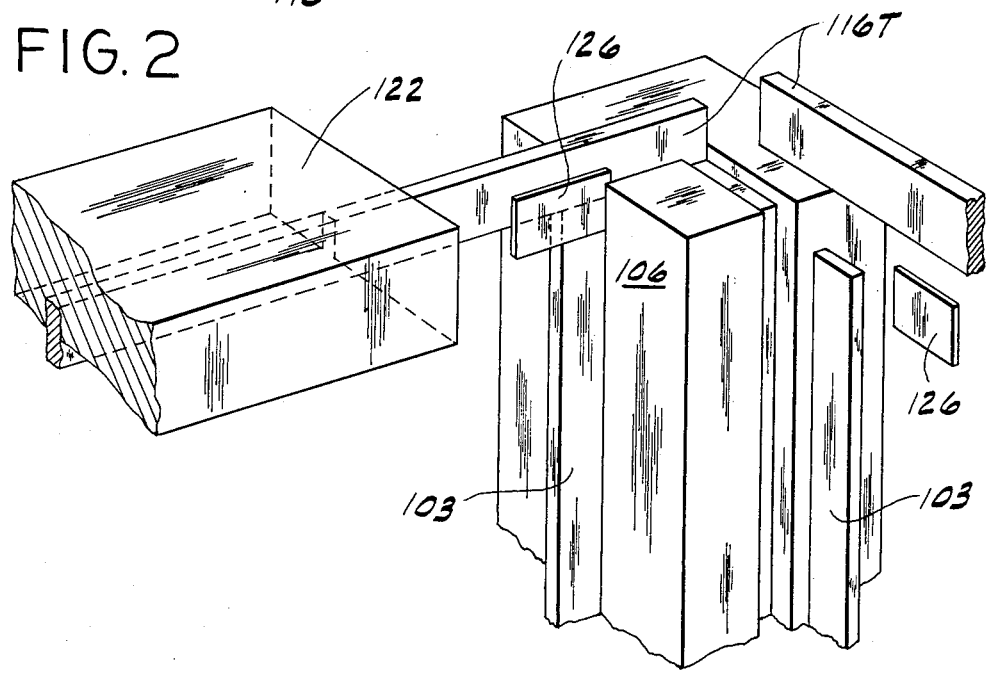

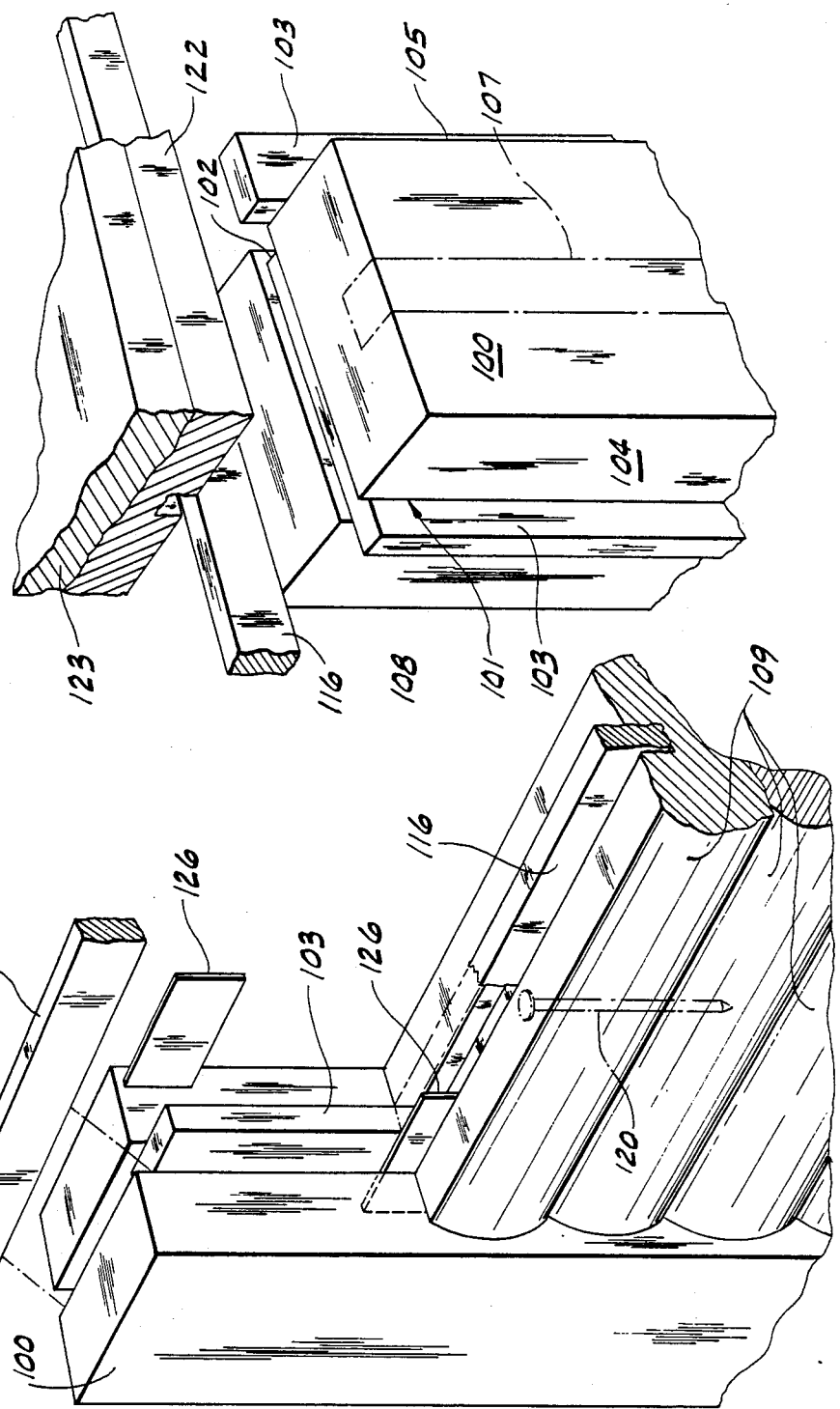

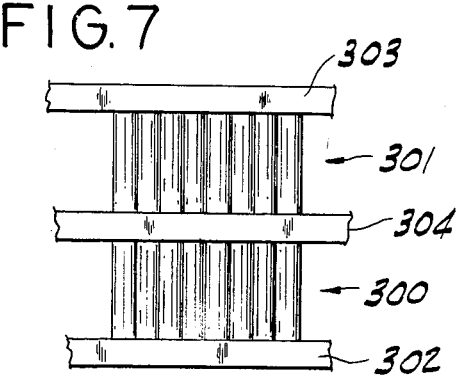
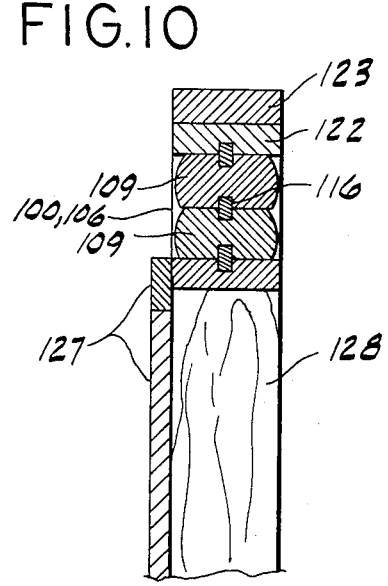
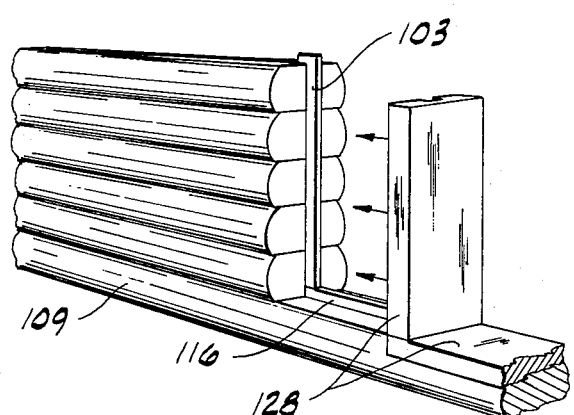
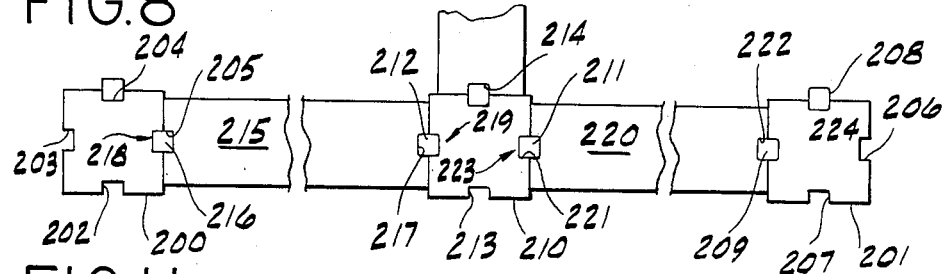
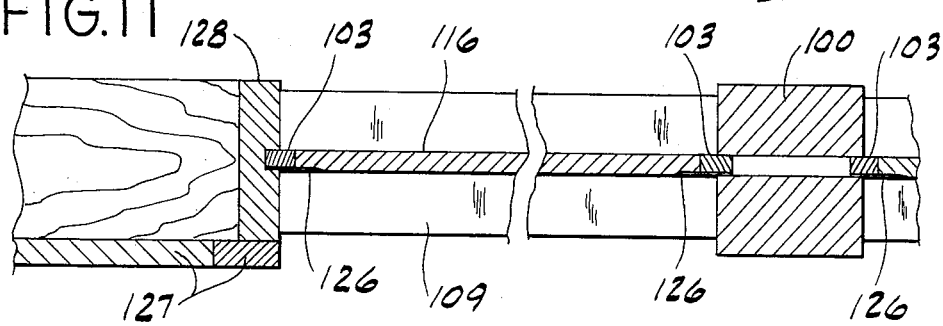

WALL STRUCTURE AND METHOD OF MAKING

This application is a continuation-in-part of Ser. No. 665,442 filed Oct. 26, 1984, now abandoned.

BACKGROUND OF THE INVENTION

1. Field of the Invention

The invention generally relates to wall structures and a method of making a wall structure. In particular, the invention relates to a wall structure having vertical end members and at least one vertical intermediate member between stacked horizontal, dimensioned members located between the intermediate end members and engaging such members with vertical splines.

2. Background of the Invention

Log Cabin construction systems are well known in the prior art. For example, U.S. Pat. No. 4,219,977 shows a log building construction which is prefabricated and has walls formed by horizontally extending, vertically stacked log courses joined by tongue and groove joints. U.S. Pat. No. 4,250,677 illustrates a wall structure having a multiplicity of elongaged wall panel forming members and elongaged wall periphery forming members. The wall panel forming members are constructed to extend in horizontal courses with alternate courses being formed of siding elements and bar elements. U.S. Pat. No. 4,279,108 relates to joint construction wherein each log is provided with a tongue in the upper surface and a rectalinear groove in the lower surface thereof. U.S. Pat. No. 2,320,466 illustrates a log cabin construction wherein a vertical member is secured to each of the wall sections.

U.S. Pat. No. 2,403,934 describes a building construction wherein the plurality of walls of the house are formed of timbers. To join together registering end portions of the timbers, which are at right angles to each other, corner members A, shown in perspective in FIG. 1, are employed. Corner members A have surfaces B and C and are at right angles to each other and the remaining surface D is of arcuate shape for appearance. Two grooves E,F are provided extending longitudinally of the corner member. Each groove is in registration with the registering grooves of a set of superposed timbers, and a key member joins a plurality of superposed timbers with corner member A. Preferably, in buildings as shown by U.S. Pat. No. 2,403,934, a member of timbers are laid in superposed or stacked relation with their end grooves in registration and then a key member is inserted in the end grooves. The timbers forming a wall at right angles to the first mentioned wall are inserted in place with their end grooves slidingly engaging a key member. This may be continued around forming three walls of the house. As the fourth wall is formed, the timbers may be moved downwardly from the top or the construction left loose enough so that upon tightening of corner member A, timbers and keys will all be positioned. In particular, see from column 3, line 59 to column 4, line 14 of U.S. Pat. No. 2,403,934. For reference purposes, the entire specification and drawings of U.S. Pat. No. 2,403,934 are incorporated herein by reference. None of the references teaches the use of intermediate vertical members and their associated vertical splines in combination with horizontal, dimensioned members as part of the wall structure construction.

SUMMARY OF THE INVENTION

It is an object of this invention to provide a wall structure having intermediate vertical members and to provide said intermediate vertical members with opposing vertical slots for engaging vertical splines and for engaging the ends of stacked dimensioned, horizontal members.

It is another object of this invention to provide a wall structure and method of making it which may employ dimensioned logs, such as eight foot long peeler core logs.

The wall structure according to the invention comprises first and second substantially vertical end members. Each of the end members has a vertical slot for engaging a vertical spline and having a top end with a horizontal top slot for engaging a top horizontal spline. At least one substantially vertical intermediate member is located between the end members. The intermediate member has opposing first and second vertical slots for engaging vertical splines and has a top end with a horizontal top slot for engaging a top horizontal spline. The first set of a plurality of substantially horizontal, dimensioned members is located between the first vertical end member and the intermediate member. Each end of the horizontal members has a vertical slot for engaging a vertical spline. The horizontal members are stacked into a course so that the vertical slots of the first ends thereof are aligned and so that the vertical slots of the second end thereof are aligned. A second set of a plurality of substantially horizontal, dimensioned members is located between the intermediate member and the second end member. Once again, each end of the horizontal members has a vertical slot for engaging the vertical spline. The horizontal members are stacked so that the vertical slots of the first end thereof are aligned and so that the vertical slots of the second end thereof are aligned.

A first vertical spline engages and is located within a vertical slot of the first vertical end member and further engages and is located within the vertical slot of the first end of at least one of the horizontal members of the first set. A second vertical spline engages and is located within the vertical slot of the second end of at least one of the horizontal members of the first set and further engages and is located within the first vertical slot of the intermediate member. A third vertical spline engages and is located within the second vertical slot of the intermediate member and further engages and is located within the vertical slot of the first end of at least one of the horizontal members of the second set. A fourth vertical spline engages and is located within the vertical slot of the second end of at least one of the horizontal members of the second set and further engages and is located within the vertical slot of the second vertical end member. A first top horizontal member having first and second ends is provided. Each end has a vertical slot engaging the first and second vertical splines. The first top horizontal member also has a horizontal slot in the top thereof for engaging a top spline and in registry with the horizontal top slots of the first vertical end member and the vertical intermediate member. A second top horizontal member having first and second ends is provided. Each end has a vertical slot engaging the third and fourth vertical splines. The second top horizontal member also has a horizontal slot in the top thereof for engaging a top spline and in registry with the top slots of the vertical intermediate member and the second vertical end member. At least one top spline is located in and engages the top horizontal slots of the first and second top horizontal members, of the first and second vertical end members and fo the vertical intermediate member. A first top cap having a slot in the underside thereof engages the top spline. The first top cap spans across the vertical intermediate member.

BRIEF DESCRIPTION OF THE DRAWINGS

FIG. 1 is a perspective of a corner member according to the prior art as shown in FIG. 5 of U.S. Pat. No. 2,403,934.

FIG. 2 is a partial perspective view of a corner member and its associated horizontal and vertical splines and joint tab.

FIG. 3 is a partial top perspective view of a horizontal member having a horizontal spline end notch.

FIG. 4A is an end view of a course of horizontal members.

FIGS. 5A and 5B are partial perspective views of an intermediate member having its end engaging horizontal members.

FIG. 7 is a front view of an alternative embodiment of the invention wherein the courses are vertically stacked and intermediate members are horizontal.

FIG. 8 is a top view of a wall according to the invention.

FIG. 10 is a partial vertical sectional view of a window structure taken along line 10—10 of FIG. 4B.

FIG. 11 is a partial horizontal sectional view of a window structure taken along line 11—11 of FIG. 4B.

FIG. 12 is a perspective view of a partially assembly window or door frame structure in a wall.

DETAILED DESCRIPTION OF THE INVENTION

Figure 6:
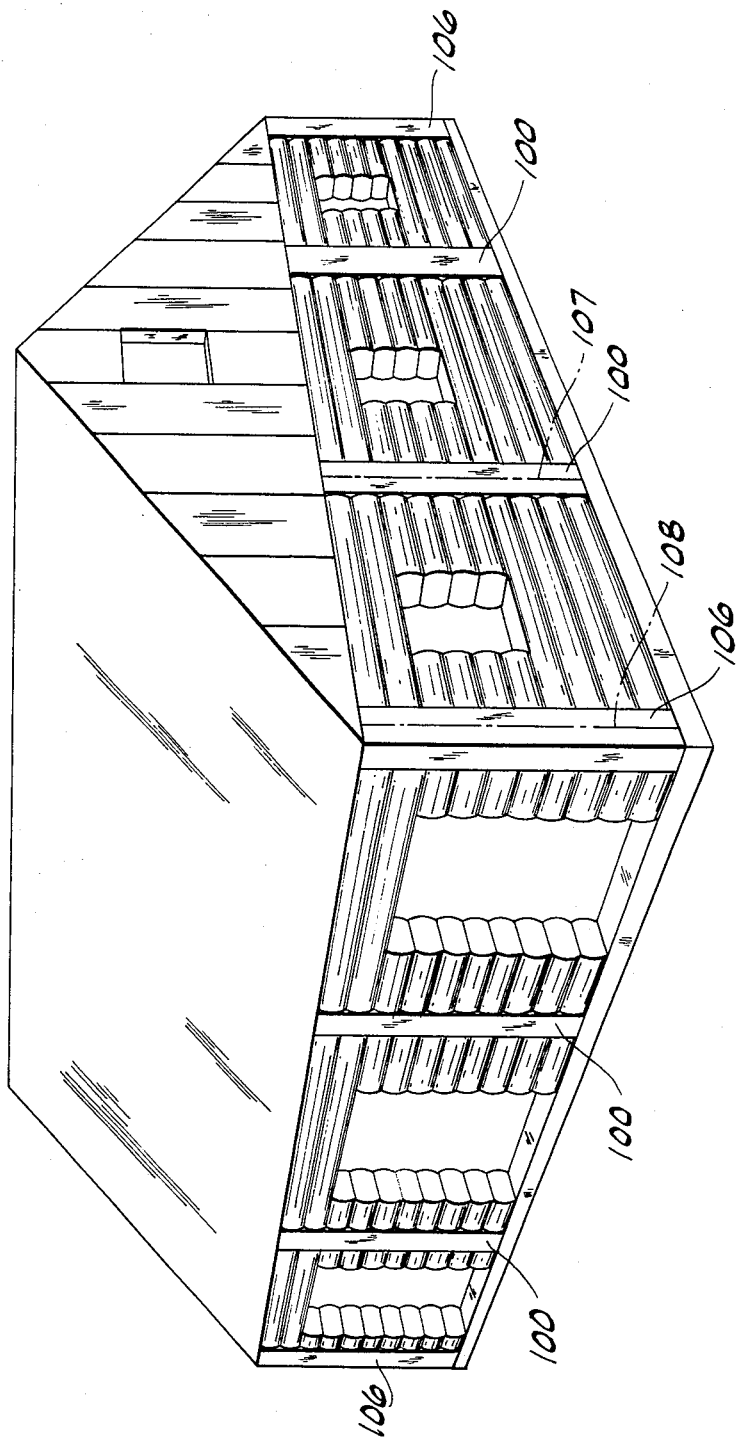
FIG. 6 is a perspective view of a log cabin according to the invention.

An essential aspect of the invention is intermediate members 100 in FIG. 6 having opposing vertical slots 101, 102, as shown in FIG. 5A. Intermediate members 100 are used in the construction of each wall according to the invention. End members 106 are of the kind shown in FIGS. 2 and 4B. As compared to the prior art shown in FIG. 1, members 106 do not have arcuate outersurfaces B and are provided with top and bottom slots for engaging top spline 116T and bottom spline 116B. In addition, end members may be provided with opposing vertical slots as will be explained below to permit additions to be added.

As shown in FIGS. 5A and 5B, it is contemplated that the intermediate members 100 and end members 106, are standard 8 foot long 6"×6" having opposing vertical slots, 101, 102 and opposing sides 104, 105, thereof. In addition, intermediate posts 100 may be provided with additional slots such as vertical slot 107 and vertical slot 108. The purpose of these additional slots, as will become apparent with the below description, is to engage additional peripheral walls as shown in FIG. 8. Specifically, referring to FIG. 8 intermediate member 210A each engages three sets of courses of horizontal, dimensioned members. For convenience, it is contemplated that intermediate members 100 and end members 106 are of the same construction and have four vertical slots, one on each side thereof, so that such members can be used interchangeably as intermediate members or end members and so that three vertical slots are available whenever it is desired to add additional walls according to the invention.

As shown in FIGS. 3, 4 and 5, each horizontal member 109 may be manufactured from a peeler core log or other dimensioned log such as a landscape tie. Generally, such peeler core logs have arcuate surfaces 110 and 111 and flat surfaces 112 and 113 which result from slab cutting of the logs for shipping and stacking purposes. Generally, surface 112 is wider than surface 113 so that stacking results in an overhang 115 as shown in FIG. 4A which functions to prevent rain from entering the wall. Horizontal members 109 are further provided with upper horizontal slot 114 and lower horizontal slot 118 for engaging horizontal splines 116. In addition, each end of horizontal member 109 is provided with the vertical slot in the form of end notch 117 for engaging vertical splines.

In order to further create a weather-tight structure, a spline joint tab is located within the corner formed by the meeting of horizontal and vertical slots. Tab 126 covers and seals the joints where horizontal and vertical splines meet throughout the entire structure, including window and door frame openings. Tabs 126 are also used to seal joints in the top spline 116T located between the upper course of logs 109 and the lower slotted cap plate 12. Furthermore, all splines are continuous and run the full length of each log or slot in order to create a completely sealed, weather-tight structure. It is contemplated that nails 120 as shown in FIG. 4A may be used to engage adjacent logs 109. It has been found that alternate front and back nailing on each side of the spline creates a secure structure. This alternating pattern prevents racking and twisting of the logs 109 and prevents lateral movement between log courses. Finally, caulking 131 (see FIG. 4A) may be added between courses.

A wall structure according to the invention may include first and second substantially vertical end members 200, 201 as shown in FIG. 8. Each of the end members 200, 201 has vertical slots 203-209 for engaging vertical splines. One substantially vertical intermediate member 210 is located between end members 200, 201. Intermediate member 210 has opposing vertical slots 211, 212 and may also have additional slots such as 213, 214. A first course 215 of horizontal members is locate dbetween end member 200 and intermediate member 210. Each end of each vertical member has a vertical slot in the form of end notch 216. 217. The end notches are aligned so that they engage vertical spline 218 which is located in slot 205 of end member 200 and also so that they engage vertical spline 219 which is located in vertical slot 212 of intermediate member 210.

A second course 220 of a plurality of substantially horizontal members stacked on top of each other is located between intermediate member 210 and end member 201. Once again, each horizontal member of course 220 has an end notch 221 and 222 for engaging vertical spline 223 and vertical spline 224. Vertical spline 223 also engages slot 211 of intermediate member 210 and vertical spline 224 also engages slot 209 of end member 201.

Preferably, the invention may be constructed of dimensioned lumber so that all vertical members are 8 foot long 6"×6" having the appropriate slots therein. As a result, the vertical and horizontal splines would be substantially each eight feet long. However, it is not necessary that the vertical splines be the equal length of the vertical members and a limited number of short vertical splines may be used to engage the end notches of the horizontal members.

Furthermore, the horizontal splines may not be the full length of the horizontal members and are considered optional. In fact, the horizontal members need not engage each other or, alternatively, may be nailed to each other. Horizontal splining is considered preferable because the horizontal slots relieve stresses which may build up in the horizontal members.

The invention may be of the form of the log structure kit which includes horizontal and vertical splines therefore. In addition, the invention includes the particular method which may be used to assemble the kit. Specifically, the vertical members are positioned or held in place, the vertical splines are inserted in the appropriate vertical slots and then the horizontal members are stacked into place, one at a time. As the horizontal members are stacked, they are appropriately engaged to each other such as by horizontal splines and/or nails.

The intermediate members also function as stiffeners within each wall according to the invention giving the wall a significant amount of rigidity. In particular, it has been found that a wall and/or a cabin according to the invention is extremely stable and rigid. As a result, additional supports or strengthening items are unnecessary. For example, Lindstrom in U.S. Pat. No. 2,403,934 suggests the use of bolt 39 end nut 40 as shown in FIG. 15 of the patent to add strength to the end member and its associated courses. Furthermore, portions of the horizontal members may be cut away for window and door rough openings as generally illustrated in FIG. 6. Such window and door rough openings may be horizontally and vertically splined and framed before installation. The windows and doors do not effect the structure rigidity of the invention and the splining of the frame around them prevents drafts.

Horizontal and vertical splining according to the invention also provides a structure which may survice for a significant period of time. Such horizontal and vertical splining results in less stress warp and cracking within the vertical and horizontal members due to such stress. In particular, the horizontal and vertical slots prevent bowing, twisting, bulgeing or crumbling of the members after the wall is contructed and the members begin to age. Furthermore, construction and expansion of the wall structure is controlled by horizontal splining. However each eight foot section of the wall structure is free to contract or expand within significant limits so that the aging process does not effect the structural rigidity of the wall.

It is contemplated that the interior vertical slots of intermediate members may be used to build additional walls or may be used to contain conduit or other electrical wiring. In addition, it is preferred that the wood used for assemblying the wall structures according the to the invention by pressure treated or wohlmanized to further add longevity.

As shown in FIG. 7, an alternative embodiment of the invention is also contemplated wherein courses 300 and 301 are vertical members located between end members 302 and 303 having intermediate member 304 therebetween. A wall construction of FIG. 7 is substantially the same as that described above except that any references to horizontal and vertical splining in slots are reversed.

Figure 9:
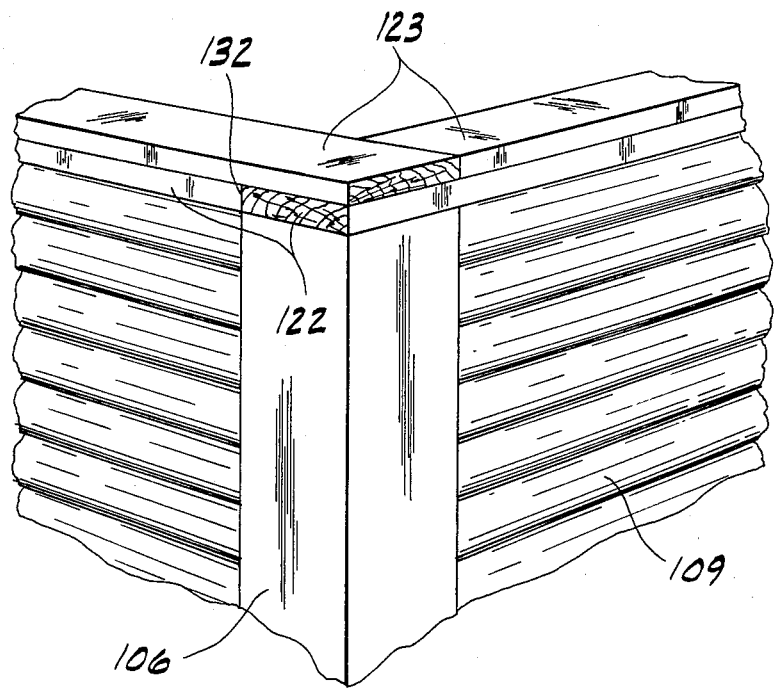
FIG. 9 is a partial perspective view of a corner member engaging double cap plates forming a cap joint.
Figure 13:
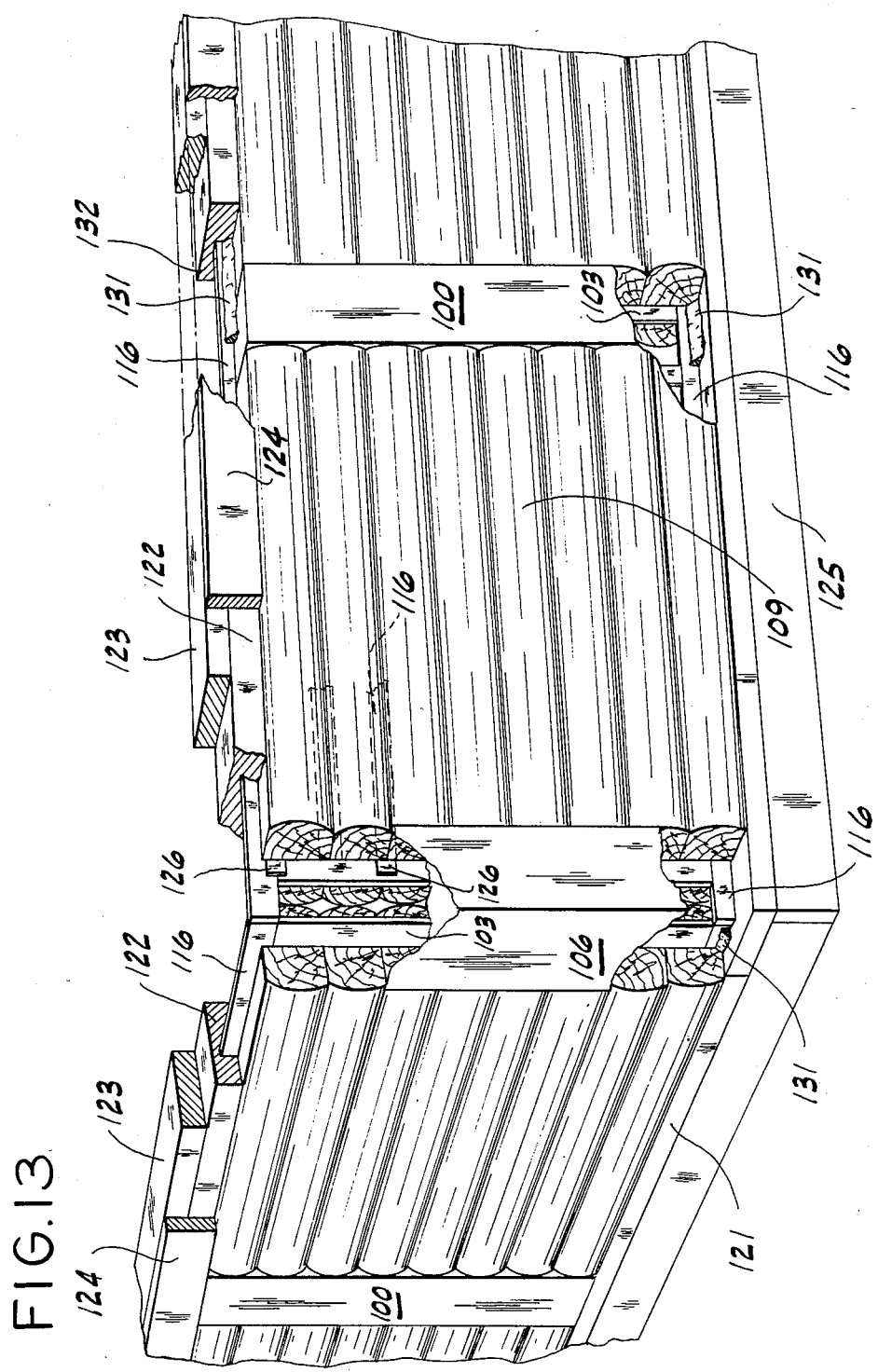
FIG. 13 is a perspective view; patially broken away, of the structure of the corner of a cabin according to the invention.

Another feature of the invention is overlapped double top plates. As shown in FIGS. 2, 4A, 4B, 5A, 9 and 13, a lower slotted cap plate 122 is located above the top course of logs 109. The underside of plate 122 is slotted and engages top spline 116T. On top of the lower plate 122 is located a second upper unslotted cap plate 123 which overlaps the point 132 where the lower cap plates abutt. This aspect is shown in FIGS. 9 and 13. Furthermore, the lower cap plate 122 must span across vertical member 100 as shown in FIGS. 5A and 13. This adds rigidity to adjacent stacked sections of the walls according to the invention. Finally, a side board 124 is placed on the front of the cap plates 122 and 123 to provide further weatherproofing and roof rafter 129 is notched to engage these top caps.

Figure 4B:
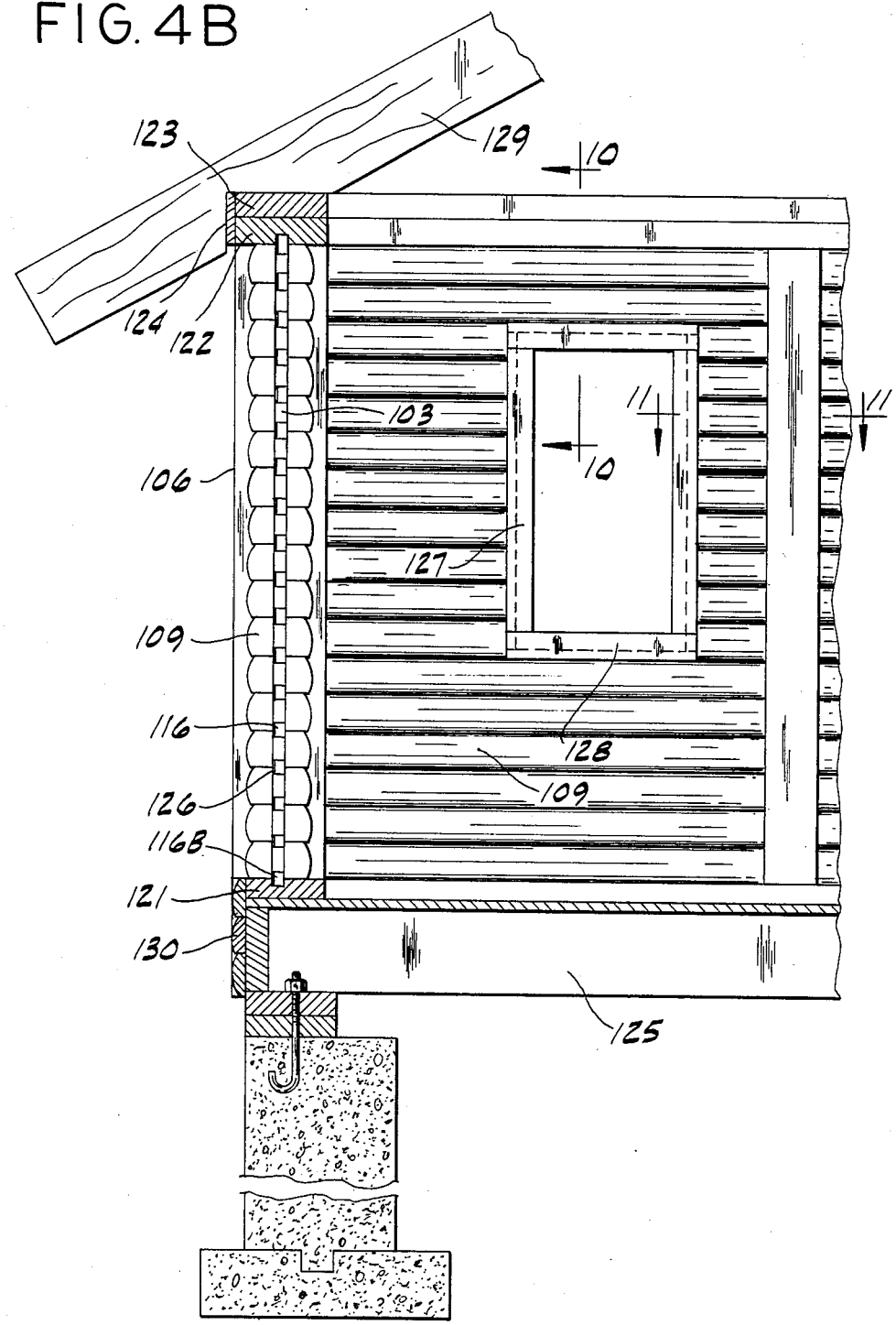
FIG. 4B is an end view of a course of horizontal members forming a corner of a cabin.

As illustrated in FIG. 4B, floor header board 125 is engaged by bottom plate 121 having a slot in its top surface for engaging bottom spline 116B. This whole structure is then covered by log face boards 130 to match the exterior appearance of the log cabin.

Referring to FIGS. 10, 11, and 12, the structural arrangement of the door and/or window framing is shown. Logs 109 are terminated in an end slot which engages a vertical spline 103 which, in turn, engages a slot in door/window framing 128. On the face thereof, a window stop board 127 may be located.

FIG. 13 also illustrates many features of the invention in combination. The slotted bottom plate 121 and horizontal spline 116B provide a full seal between the first course of logs and the floor. Plate 121 and spline 116B engage a bottom slot on each post for sealing and locking the post into plate 121 for attachment to floor deck. This prevents kickout of post bottom.

The plates 122, 123 and side board 124 provide a full seal around the walls above the last course of logs. Because bottom cap 122 spans vertical members 100, it provides means to straighten each log panel in relation to the next panel and results in straight and aligned full wall structure. The side board 124 provides strength and a full seal between two top plates.

All of the above invention has been described with general detail relating to its use as a wall structure or building construction. It is anticipated that the invention may have additional specific applications in other areas. Accordingly, the scope of the invention should be considered to be defined by the following claims and not by the above description.

What is claimed is:

1. A wall structure comprising:
 (a) first and second substantially vertical end members, each of the vertical end members having a vertical dimension substantially greater than its horizontal dimension, having a vertical slot for engaging a vertical spline and having a top end with a horizontal top slot for engaging a top horizontal spline;
 (b) at least one substantially vertical intermdiate member having a vertical dimension substantially greater than its horizontal dimension, having opposing first and second vertical slots for engaging vertical splines and having a top end with a horizontal top slot for engaging a top spline;
 (c) a first set of a plurality of substantially horizontal, dimensioned members having a horizontal dimension substantially greater than its vertical dimension and having first and second ends, each end having a vertical slot for engaging the vertical spline, said horizontal members of said first set stacked so that the vertical slots at the first ends are aligned and the vertical slots of the second ends are aligned;

(d) a second set of a plurality of substantially horizontal, dimensioned members having a horizontal dimension substantially greater than its vertical dimension and having first and second ends, each end having a vertical slot for engaging a vertical spline, said horizontal members of said second set stacked so that the vertical slots of the first ends are aligned and so that the vertical slots of the second ends are aligned;

(e) a first vertical spline engaging and located in the vertical slot of the first vertical end member and further engaging and locating in the vertical slot of the first end of at least a particular one of the horizontal members of the first set;

(f) a second vertical spline engaging and located within the vertical slot of the second end of at least one of the horizontal members of the first set and further engaging and located within the first vertical slot of the intermediate member;

(g) a third vertical spline engaging and located within the second vertical slot of the intermediate member and further engaging and located within the first end of at least a particular one of the horizontal members of the second set;

(h) a fourth vertical spline engaging and located within the vertical slot of the second end of at least one of the horizontal members of the second set and further engaging and located within the vertical slot of the second vertical end member;

(i) a first top horizontal member having a horizontal dimension substantially greater than its vertical dimension and having first and second ends, each end having a vertical slot engaging the first and second vertical splines, said first top horizontal member having a horizontal slot in the top thereof for engaging a top spline and in registry with the horizontal top slots of the first vertical intermediate member;

(j) a second top horizontal member having a horizontal dimension substantially greater than its vertical dimension and having first and second ends, each end having a vertical slot engaging the third and fourth vertical splines, said second top horizontal member having a horizontal slot in the top thereof for engaging a top spline and in registry with the horizontal slots of the vertical intermediate member and the second vertical end member;

(k) at least one top spline located in and engaging the top horizontal slots of the first and second top horizontal members, of the first and second vertical end members and of the vertical intermediate member;

(l) a first top cap having a slot in the underside thereof which engages the top spline, said first top cap spanning across the vertical intermediate member; and (m) each of said horizontal members having an upper slot and a lower slot wherein the upper slot of each upper horizontal member is aligned with the lower slot of its adjacent, lower horizontal member which is stacked above it and wherein a horizontal spline is located within the aligned upper and lower slots of adjacent horizontal members and a spline tab is located adjacent to the end of each horizontal spline, said tab engaging the upper and lower slots and the vertical slot of the vertical member adjacent to said upper and lower horizontal members.

2. The wall structure of claim 1 wherein said horizontal, dimensioned members are peeler core logs and wherein said horizontal dimension of said horizontal dimensioned members corresponds to the length of said logs.

3. The wall structure of claim 2 wherein the first vertical spline has a length which is equal to the height of the first vertical end member, the second and third vertical splines have lengths equal to the height of the intermediate member, and the fourth vertical spline has a length equal to the height of the second vertical end member.

4. The wall structure of claim 3 wherein said first vertical end member, said intermediate member and the second vertical end member have the same height as the first and second sets and the horizontal members are stacked to a height substantially equal thereto.

5. The wall structure of claim 1 having first, second and third horizontal members wherein the front portion of the first and second horizontal members are nailed together and the rear portion of the second and third horizontal members are nailed together.

6. The wall structure of claim 2 comprising at least two substantially vertical intermediate members located between the first and second substantially vertical end members, said intermediate members having a third set of substantially horizontal members located therebetween.

7. The wall structure of claim 6 wherein the first substantially vertical end member has an additional vertical slot for engaging a vertical spline of another set of substantially horizontal members thereby forming a wall at an angle to said wall structure.

8. The wall structure of claim 2 wherein said substantially vertical member has an additional vertical slot engaging a vertical spline for engaging another set of a plurality of substantially horizontal members thereby forming a wall at an angle to said wall structure.

9. The wall structure of claim 1 including a second top cap located on top of said first top cap and spanning across end joints in ajacent first top caps.

* * * * *